W. S. GILLETTE.
TIRE CORE.
APPLICATION FILED AUG. 23, 1920.

1,363,109.

Patented Dec. 21, 1920.
2 SHEETS—SHEET 1.

WALTER S. GILLETTE
INVENTOR

BY Victor J. Evans
ATTORNEY

W. S. GILLETTE.
TIRE CORE.
APPLICATION FILED AUG. 23, 1920.

1,363,109.

Patented Dec. 21, 1920.
2 SHEETS—SHEET 2.

WALTER S. GILLETTE
INVENTOR

BY Victor J. Evans
ATTORNEY

UNITED STATES PATENT OFFICE.

WALTER S. GILLETTE, OF BAY CITY, TEXAS.

TIRE-CORE.

1,363,109.

Specification of Letters Patent.　　Patented Dec. 21, 1920.

Application filed August 23, 1920.　Serial No. 405,283.

*To all whom it may concern:*

Be it known that I, WALTER S. GILLETTE, a citizen of the United States, residing at Bay City, in the county of Matagorda and State of Texas, have invented new and useful Improvements in Tire-Cores, of which the following is a specification.

My present invention has reference to a core on which tires are built.

The primary object is the production of a core for this purpose which is of a collapsible or knock-down nature whereby the same may be readily removed from the tire after the latter has been molded thereon, thus obviating the necessity of pulling the same and damaging the molded tire in its removal from the core.

A still further object is the production of a sectional knock-down core for tire building in which interengaging means is provided between certain of the sections thereof, and adjustable means between the remaining sections, said adjustable means not being designed to expand or contract the core so that the same may be used on different sized tires, but only to permit of such contraction and expansion as to properly adjust the core to the size of the tire for which the core is provided, and for permitting the ready breaking down of the core sections when the same are removed from the molded tire.

It is a still further object to produce a break-down tire building core in which the joint between the end sections thereof is covered by a smooth slidable shell after the proper adjustment between said sections has been made and which shell produces a smooth covering between the said end sections.

The foregoing, and other objects which will appear as the nature of the invention is better understood, may be accomplished by a construction, combination and operative arrangement of parts, such as is disclosed by the drawings.

In the drawings:—

Figure 1:
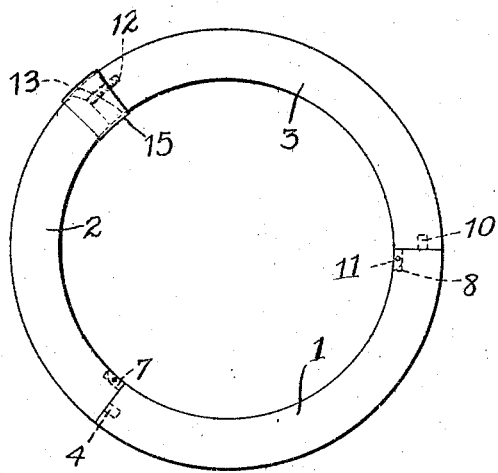
Figure 1 is a view of a tire building core constructed in accordance with this invention.

My improved tire building core comprises any desired number of segmental sections, three being illustrated by the drawings. For distinction, I will refer to one of the sections as the inner section, and have designated the same by the numeral 1, and the remaining sections as the end sections, which are designated by the numerals 2 and 3 respectively. The confronting ends of the inner section 1 and the end sections 2 and 3 are provided with interengaging means. The end of the section 2 is formed centrally with an extending lug 4 and has its inner edge centrally provided with a depression or socket 5. The end of the inner section 1, which, confronting the end of the section 2 has a central socket 6 to receive the lug 4 and a rectangular projection in the nature of a tongue 7 that is received in the slot 5. The opposite end of the inner section 1 has its inner edge provided with a rectangular slot 8 and with a central projecting lug 9. The confronting edge of the end section 3 has a socket 10 to receive the lug 9 and a rectangular tongue 11 to be received in the slot 8.

Threadedly received in an opening 12 in the outer end of the section 3 is a bolt 13. The bolt is non-headed, but is provided, adjacent its outer end with radially disposed apertures 14.

The end of the section 2 which confronts the end of the section 3 is preferably, but not necessarily, beveled from its opposite sides to its center. When the sections are assembled, a suitable instrument is passed through the apertures, 14, in the bolt 12, to adjust the core with respect to the tire that is to be molded thereon. Before such adjustment is made, however, a shell 15 constructed of thin material and corresponding in shape to the cross sectional contour of the core is arranged on the section 2. When the proper adjustment has been made, the instrument is, of course, removed from the apertured bolt, and the shell 15 is slid partly off of the section 2 on to the section 3, thus covering the joint between the sections. After the tire has been molded on the core the shell covering member 15 is slid on to either of the sections 2 or 3, and the manipulating element is again inserted into the bolt, screwing the bolt into the opening 12, a sufficient distance to permit of the disconnection of all of the section that constitute the core.

It is thought that the foregoing description, when taken in connection with the drawings, will fully set forth the construction, operation and advantages of the improvement.

It should be stated that the rectangular tongues are provided with beveled or rounded ends which fit into the rectangular slots on the abutting segments and hold the core true to each abutting end and also enables the core to "break down" instead of being knocked down. Further there is a slot cut laterally through this rectangular tongue and through this slot a pin is inserted, thus holding the tongue in the slot and giving the whole core a hinged feature which permits of the collapse or break down arrangement rather than that of the knock down.

The core may be constructed of wood, metal, fiber or of hollow material with solid segment ends.

Figure 9:
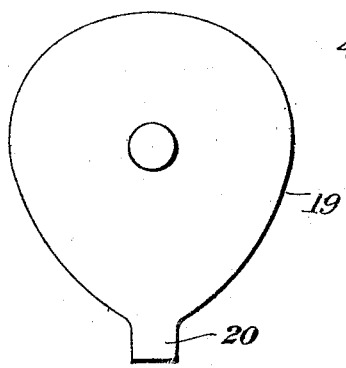
Fig. 9 is an end view of a modified form of the core sections.
Figure 2:
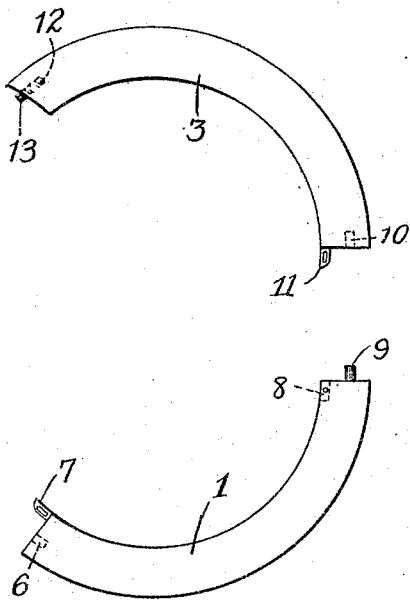
Fig. 2 is a similar view but showing the parts separated as when the core is broken down.
Figure 3:
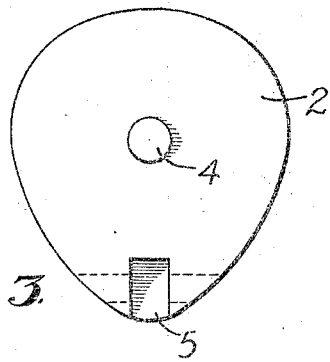
Fig. 3 is an end view of one of the core sections.
Figure 4:
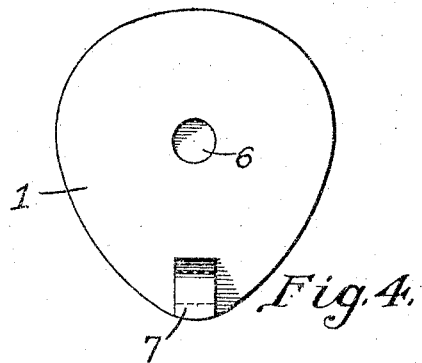
Fig. 4 is a similar view of the coacting core section.
Figure 6:
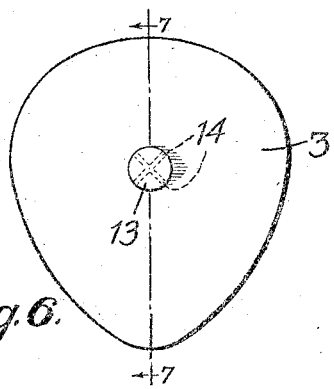
Fig. 6 is a similar view of the second end core section.
Figure 5:
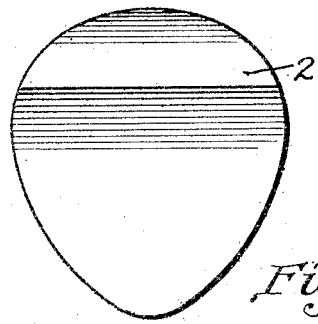
Fig. 5 is an end view of one of the end core sections.
Figure 7:
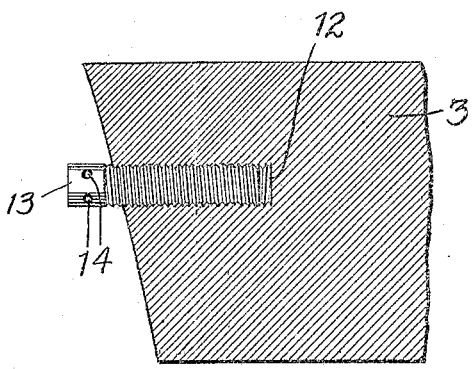
Fig. 7 is a sectional view approximately on the line 7—7 of Fig. 6.
Figure 8:
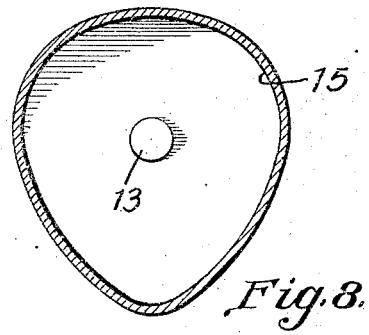
Fig. 8 is a fragmentary sectional view between the end sections showing the arrangement of the joint covering sleeve thereon, after the sections have been adjusted.

In Fig. 9 I have shown a core section 19 that has its inner edge formed with a lip 20.

Having thus described the invention, what I claim, is:—

1. A tire building core made up of an inner and end segments, the confronting faces of the end and intermediate sections having sockets and grooves to receive tongues and lugs carried by said sections, a bolt received in a threaded socket in the outer face of one of the end sections and adjustable to contact with the front face of the second end section, and a covering for the joint between the end sections.

2. A tire building core made up of an intermediate segment and end segments, the confronting faces of the intermediate and end sections having sockets and tongues which coengage for locking said sections together, one of the end sections having its outer face provided with a threaded socket, a bolt received therein and adjustable with respect thereto, whereby the said bolt may be brought to contact with the outer face of the second end section, and a shell slidable over the end sections for covering the joint therebetween.

In testimony whereof I affix my signature.

WALTER S. GILLETTE.